US006639655B2

(12) United States Patent
Ishizuka

(10) Patent No.: US 6,639,655 B2
(45) Date of Patent: Oct. 28, 2003

(54) PHOTOSENSITIVE MATERIAL MAGAZINE

(75) Inventor: Tetsuya Ishizuka, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 27 days.

(21) Appl. No.: 10/020,998

(22) Filed: Dec. 19, 2001

(65) Prior Publication Data

US 2002/0075470 A1 Jun. 20, 2002

(30) Foreign Application Priority Data

Dec. 19, 2000 (JP) ........................................ 2000-384928
Nov. 1, 2001 (JP) ........................................ 2001-336160

(51) Int. Cl.[7] .......................... G03B 27/62; G03B 27/52
(52) U.S. Cl. ............................. 355/75; 355/40; 355/41
(58) Field of Search ............................... 355/40, 41, 75, 355/72; 396/911; 242/578–578.2, 348

(56) References Cited

U.S. PATENT DOCUMENTS 4,461,554 A * 7/1984 Norris et al. ............... 354/275
5,748,290 A * 5/1998 Nakao ......................... 355/75
5,949,527 A * 9/1999 Yamamoto ................... 355/75
6,230,999 B1 * 5/2001 Tanaka ..................... 242/578.2

FOREIGN PATENT DOCUMENTS

JP          6-161052          6/1994

* cited by examiner

Primary Examiner—Henry Hung Nguyen
(74) Attorney, Agent, or Firm—Sughrue Mion, PLLC

(57) ABSTRACT

A photographic paper magazine, for containing a photographic paper roll of photographic paper, includes a magazine case. A support shaft is contained in the magazine case in a rotatable manner, and secured to an axis of the paper roll in a rotationally immovable manner. First and second flanges are disposed on the support shaft, for neatening end faces of the paper roll. A passageway is formed in the magazine case, for passage of the photographic paper in and out. Sixteen receiving pins are formed to project from an edge portion of the first flange toward the second flange, for defining a passage space between. The passage space allows passage of the photographic paper extending from the paper roll toward the passageway. When the support shaft is rotated in a winding direction, the sixteen receiving pins temporarily wind a portion of the photographic paper extending out of the passage space.

14 Claims, 12 Drawing Sheets

PHOTOSENSITIVE MATERIAL MAGAZINE

BACKGROUND OF THE INVENTION

1. Field of the Invention

The present invention relates to a photosensitive material magazine. More particularly, the present invention relates to a photosensitive material magazine in which a roll of photosensitive material is contained, and in which the photosensitive material can be fed and wound back in a state free from being scratched or damaged.

2. Description Related to the Prior Art

A photographic printer is loaded with a photographic paper magazine, which accommodates a photographic paper roll. The paper magazine includes a magazine case and an openable lid, the magazine case containing the photographic paper roll. A support shaft is contained in the magazine case in a removable and rotatable manner, and supports the photographic paper roll. The support shaft is constituted by right and left shafts coupled together in the axial direction. Those are inserted in axial end holes at ends of a winding spool of the photographic paper roll, and firmly interconnected as a single support shaft. Flanges are secured to the right and left shafts, and contact end faces of the photographic paper roll to neaten paper turns.

Photographic paper must be handled in a light-shielded state before it can be inserted in the paper magazine. JP-A 6-161052 discloses a use of light-shielding sheets, which are formed from plastic material such as polyethylene terephthalate, and fully wrap the photographic paper roll. The light-shielding sheets include a light-shielding leading sheet and light-shielding lateral sheets. The light-shielding leading sheet has a strip shape, and has a rear end attached to a front end of the photographic paper by adhesive tape. The light-shielding leading sheet has a width equal to or slightly greater than that of the photographic paper, and wraps the outermost turn of the photographic paper to shield light. The light-shielding lateral sheets are spliced to lateral edges of the light-shielding leading sheet as viewed in the longitudinal direction. The light-shielding lateral sheets are disposed to cover the two end faces of the photographic paper roll, and have outer ends inserted in and attached to the axial end holes of the winding spool. Thus, the elements are shielded from ambient light, including the edges of the peripheral face and the axial end holes of the winding spool.

Spliced portions between the light-shielding leading sheet and the light-shielding lateral sheets are structured for being broken easily. Only if the front end of the light-shielding leading sheet is pulled forcibly, the light-shielding leading sheet can be broken away from the light-shielding lateral sheets. Immediately after this, the front end continues being pulled, so that the photographic paper is pulled out after the light-shielding leading sheet. After the front end the photographic paper is pulled out of the paper magazine, the light-shielding leading sheet is cut away.

In FIG. 18, a state of the photographic paper roll secured to the support shaft is depicted. In the drawing, a winding spool 17 is supported by a support shaft 14. Flanges 15 and 16 are disposed at ends of the support shaft 14. There is photographic paper 13, which has a front end with a light-shielding leading sheet 10 secured thereto. Light-shielding lateral sheets 11 and 12 are spliced to the light-shielding leading sheet 10 along spliced portions 18 and 19.

After the light-shielding leading sheet 10 is removed, the light-shielding lateral sheets 11 and 12 remain between the end faces of the photographic paper 13 and the flanges 15 and 16 in a state where broken sheets 11a and 12a being bent back toward the peripheral face are deposited.

The printer draws out the photographic paper from the paper magazine, and subjects the same to a printing process. Should the unused portion of the photographic paper remain drawn out of the magazine, it is likely that the portion is fogged or exposed after the printing process. Thus, the photographic paper is wound back into the magazine by rotating the support shaft backwards, to dispose the front end inside the magazine or to the vicinity of the passageway.

However, the photographic paper 13 if wound back becomes mounted on the broken sheets 11a and 12a which are the unwanted remainder of the light-shielding lateral sheets 11 and 12. It is likely that lateral edges of the photographic paper 13 extending in the longitudinal direction are frictionally contacted and scratched by the broken sheets 11a and 12a. Quality in the printing may be lowered, as the printed density may be conspicuously changed at the lateral edges.

The smaller the diameter of the roll of the photographic paper 13, the longer a contacted lateral portion of the photographic paper 13 contacted by the flange 15 or 16 at the time of winding back. So quality in the printing may be lowered because the damaged lateral portions of the photographic paper 13 may be extremely long.

SUMMARY OF THE INVENTION

In view of the foregoing problems, an object of the present invention is to provide a photosensitive material magazine in which a roll of photosensitive material is contained, and in which the photosensitive material can be fed and wound back in a state free from being scratched or damaged, specifically in portions of lateral edges.

In order to achieve the above and other objects and advantages of this invention, a photosensitive material magazine, for containing a photosensitive material roll of photosensitive material, includes a magazine case. A support shaft is contained in the magazine case in a rotatable manner, and secured to an axis of the photosensitive material roll in a rotationally immovable manner. First and second flanges are disposed on the support shaft, for neatening end faces of the photosensitive material roll. A passageway is formed in the magazine case, for passage of the photosensitive material in and out. A receiving portion is formed to project from an edge portion of the first flange toward the second flange, for defining a passage space between edges thereof, the passage space allowing passage of the photosensitive material extending from the photosensitive material roll toward the passageway, wherein when the support shaft is rotated in a winding direction, the receiving portion temporarily winds a portion of the photosensitive material extending out of the passage space.

The support shaft is rotatable in an unwinding direction and the winding direction. Furthermore, a bearing device secures the first and second flanges to the support shaft, changeable in first and second states, for setting the first flange rotatable relative to the support shaft, and for setting the first flange rotationally immovable relative to the support shaft. While the photosensitive material is drawn from the photosensitive material roll, the bearing device is in the first state, for allowing the support shaft to rotate in the unwinding direction relative to the first flange stopped by the photosensitive material and the receiving portion. When the support shaft is rotated in the winding direction, the bearing device is in the second state, for rotating the first flange together with the support shaft, thereby temporarily to wind the photosensitive material on the receiving portion.

The photosensitive material roll includes a tubular winding spool on which the photosensitive material is wound in a roll form. The bearing device includes first and second cores, fitted in respectively first and second ends of the winding spool, having first and second axial holes in which the support shaft is fitted, for transmitting rotation of the support shaft to the photosensitive material roll. First and second axial openings are formed in the first and second flanges, for receiving insertion of the first and second cores.

The bearing device further includes first and second bearing mechanisms for keeping the first and second flanges rotatable about the first and second cores, thereby to set the first state. A braking mechanism is actuated when rotational torque applied between the first flange and the first core is smaller than a limit torque, for keeping the first flange stationary on the first core by braking, thereby to set the second state.

The first core includes an outer end portion and an inner end portion, the outer end portion is inserted in the first axial hole, and the inner end portion is secured to the first end of the winding spool. Each of the first and second bearing mechanisms includes plural bearing rollers, secured to an outer face of the first flange in a rotatable manner, disposed close to the first axial hole, for contacting one portion of the outer end portion of the first core, to keep the first core rotatable about the first flange.

The braking mechanism includes a first contact surface formed in the first flange. A second contact surface is formed in the first core, for frictionally contacting the first contact surface.

The receiving portion includes plural receiving pins arranged in a substantially equidistant manner from the axis.

Furthermore, plural auxiliary bearing mechanisms support respectively plural receiving pins on the first flange in a rotatable manner.

In a preferred embodiment, furthermore, holes are formed in the second flange, for coming through of the receiving pins. The receiving pins are inserted in the holes with the photosensitive material roll positioned between the first and second flanges.

In another preferred embodiment, the receiving portion includes plural arc-shaped receiving ridges arranged in a substantially equidistant manner from the axis.

The receiving portion further includes plural guide pins arranged close to the plural arc-shaped receiving ridges, having a curved surface, for preventing the photosensitive material from being damaged in passage between the plural receiving ridges.

In still another preferred embodiment, the receiving portion comprises a first group of plural receiving portions. Furthermore, a second group of plural receiving portions are formed to project from an edge portion of the second flange toward the first group, and adapted for temporarily winding a portion of the photosensitive material drawn from the photosensitive material roll.

Furthermore, plural guide pins are formed to project from the edge portion of the first flange, and arranged about a peripheral surface of the photosensitive material roll. Plural holes are formed through the edge portion of the second flange, for receiving the plural guide pins in a slidable manner.

The photosensitive material magazine is used with a printer, the printer includes a motor for rotating in first and second directions. A feeder roller is driven by the motor, for feeding the photosensitive material from the photosensitive material roll while the motor rotates in the first direction. A clutch mechanism is secured between the motor and the support shaft, for disconnecting the support shaft from the motor while the motor rotates in the first direction, and for causing the support shaft to rotate together with the feeder roller while the motor rotates in the second direction.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
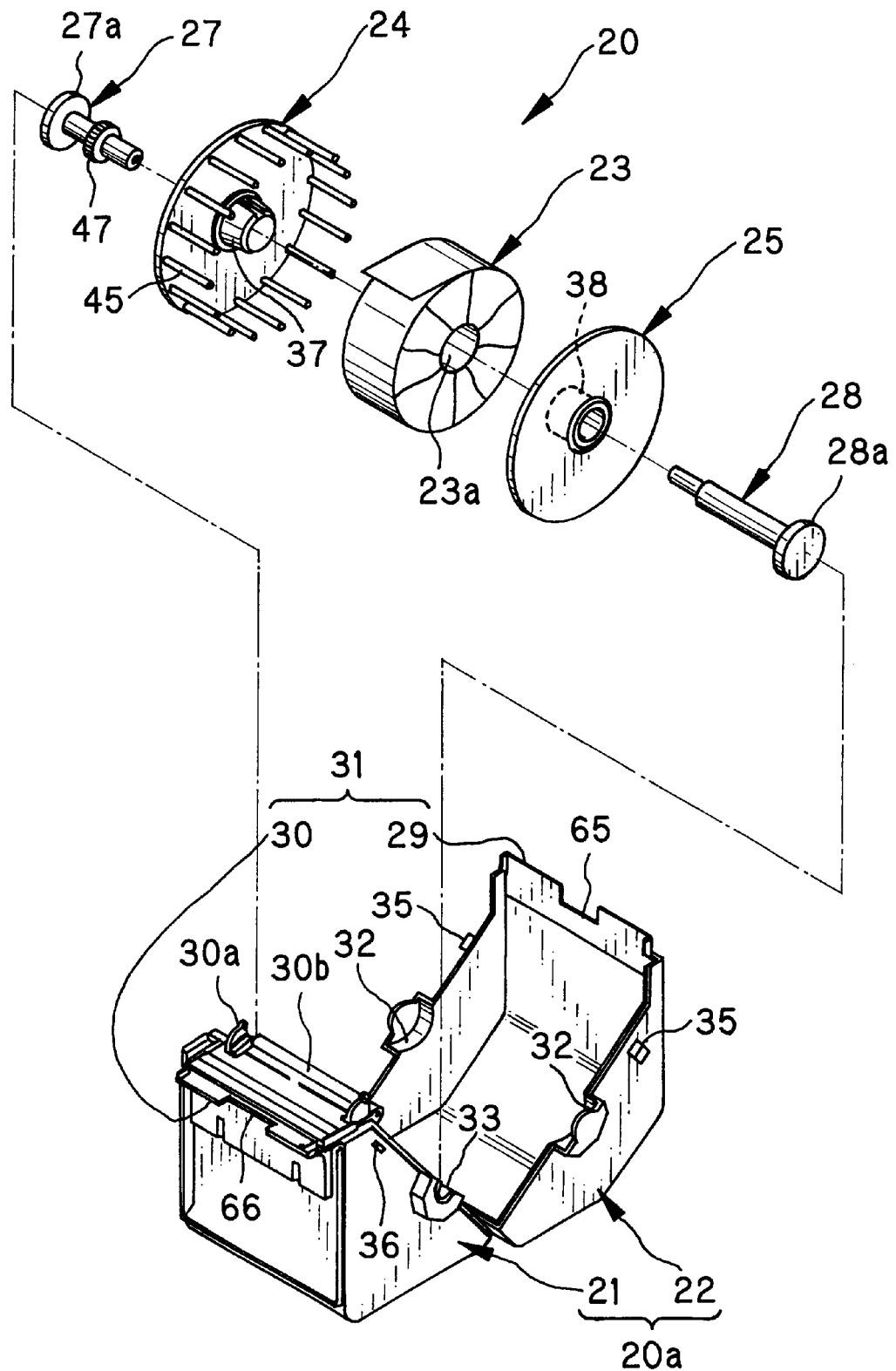
FIG. 1 is an exploded perspective illustrating a photographic paper magazine.
Figure 11:
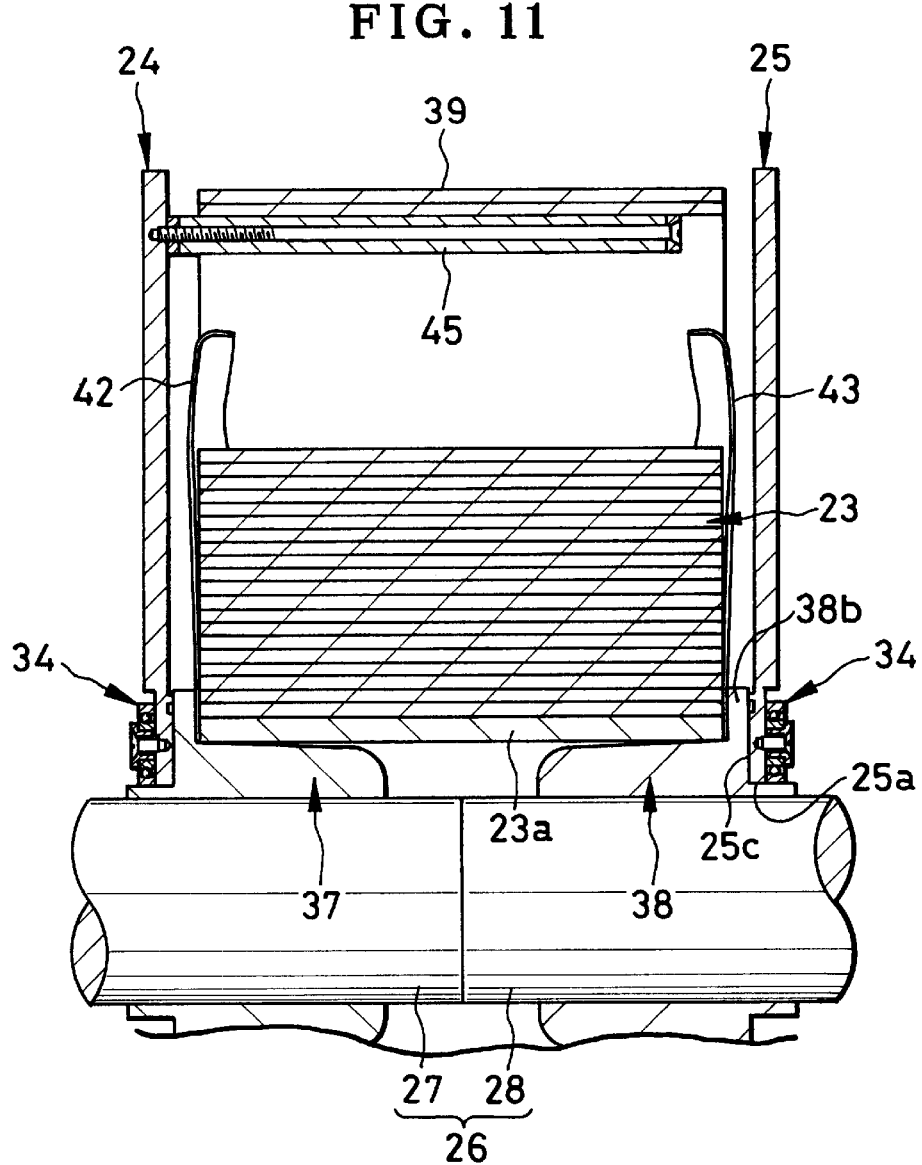
FIG. 11 is a cross section, partially cut away, illustrating the same as FIG. 10.

In FIG. 1, a photographic paper magazine 20 as photosensitive material magazine is illustrated, and includes a magazine case 20*a*, flanges 24 and 25, and a support shaft 26 (see FIG. 11). A photographic paper roll 23 as a photosensitive material roll is supported by the support shaft 26, and contained in the magazine case 20*a*. The magazine case 20*a* is constituted by a case base portion 21 and a case lid 22. The support shaft 26 includes shaft halves 27 and 28 disposed on the left and right sides. The case lid 22 is openably secured to the case base portion 21. Passage guide plates 29 and 30 are formed with the case lid 22 and the case base portion 21. A passageway 31 is defined between the passage guide plates 29 and 30 when the case lid 22 is closed to the case base portion 21. Also, axial support recesses 32 and 33 are formed in the case lid 22 and the case base portion 21 for supporting the support shaft 26 in a rotatable manner. Buckles 35 and 36 are disposed on respectively the case lid 22 and the case base portion 21, and fastened together to shield the inside of the magazine case 20a from ambient light. There are edge guide projections 30a and an auxiliary roller 30b disposed in positions inward from the passage guide plate 30, to keep the photographic paper from moving in a zigzag.

Shaft ends 27a and 28a of the shaft halves 27 and 28 are supported by the axial support recesses 32 and 33. The shaft halves 27 and 28 have remaining shaft ends which are coupled with one another to constitute a single shaft. The flanges 24 and 25 are secured to the shaft halves 27 and 28 and sandwich the paper roll 23.

Cores 37 and 38 are used for receiving a winding spool. Screw holes are formed in the cores 37 and 38 in the portions with externally formed recesses. Plural types of the paper roll 23 are prepared with different paper width for plural printing sizes with correspondence. To set the flanges 24 and 25 for a designated paper width, screws can be used for fastening the flanges 24 and 25 to the shaft halves 27 and 28 in a desired position.

Figure 2:
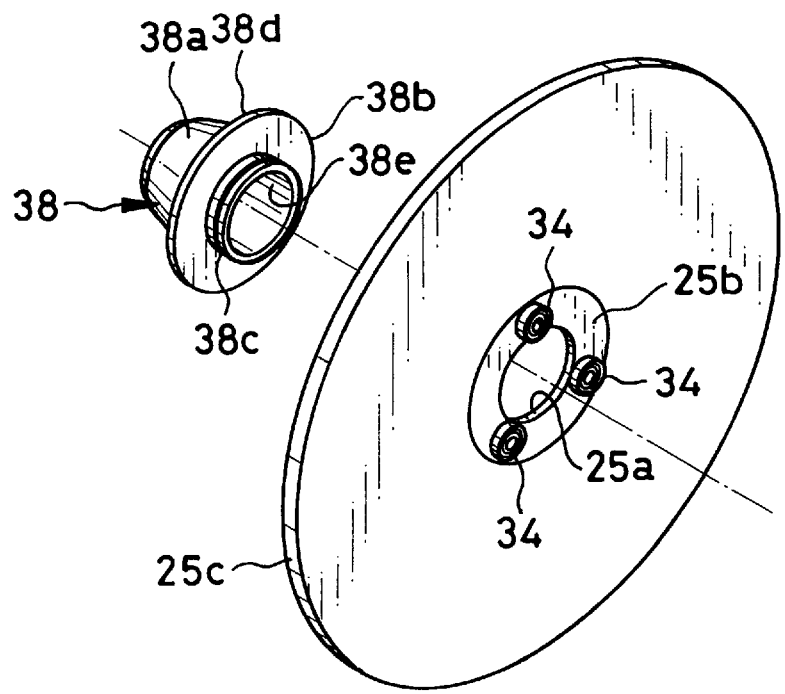
FIG. 2 is a perspective illustrating a flange and a core.
Figure 3:
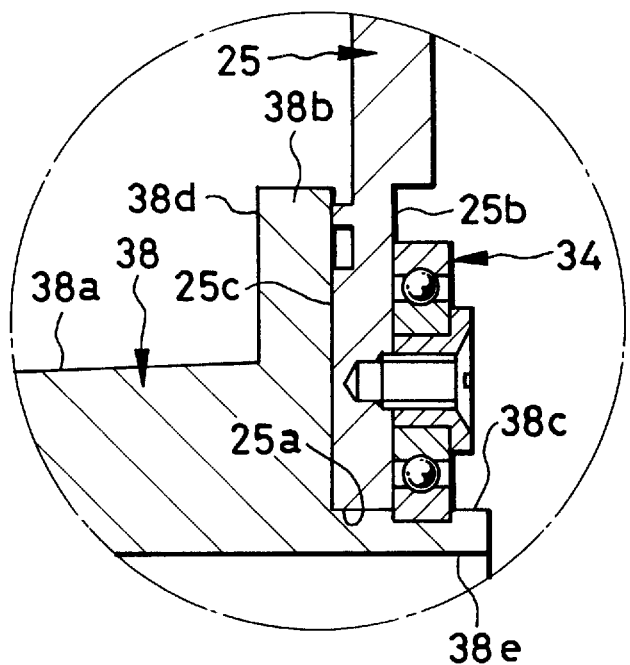
FIG. 3 is a cross section illustrating assembled portions of elements of FIG. 2.

In FIGS. 2 and 3, the core 38 is illustrated. The core 38 is one piece including an inner end portion 38a, a ring portion 38b with a braking contact surface, and an outer end portion 38c. The ring portion 38b is disposed between the inner end portion 38a and the outer end portion 38c. Note that the core 38 is shaped equally to the core 37. The flange 25 is shaped equally to the flange 24 except for receiving pins. To describe the core 37 and the flange 24, the core 38 and the flange 25 are described as a typical example. A surface 38d is provided in the ring portion 38b of the core 38, and tightly contacts the paper roll 23. The flange 25 is secured to the outer end portion 38c in a rotatable manner. An axial hole 38e is formed in the core 38 for insertion of the shaft half 28. A winding spool 23a of the paper roll 23 is cylindrical, and has two spool ends, with one of which the inner end portion 38a is engaged for supporting the winding spool 23a without offsetting the winding spool 23a. Note that the outer surface of the inner end portion 38a is conical with a diameter decreasing in a direction to the inside of the winding spool 23a, which is effective in keeping the core 38 secured removably with ease.

The inner end portion 38a is inserted in an axial end hole in the winding spool 23a, and supports the paper roll 23 in a rotationally fixed manner. An axial opening 25a is formed in the flange 25, and receives insertion of the outer end portion 38c axially. An outer face 25b of the flange 25 is provided, where three bearing rollers 34 in a bearing mechanism are disposed at an angularly regular pitch about the axial opening 25a. The bearing rollers 34 keep the flange 25 rotatable with respect to the outer end portion 38c. A braking contact surface 25c of the flange 25 contacts the ring portion 38b, which creates friction to the braking contact surface 25c, and such resistance as to cause the flange 25 to rotate together with the core 38. Note that the shape of the flanges 24 and 25 may be triangular, quadrangular, or differently polygonal instead of the circular shape.

The bearing rollers 34, the ring portion 38b and the braking contact surface 25c of the flange 25 constitutes a bearing device which, in the course of feeding, causes the paper roll 23 to rotate without rotating the flange 25, and in the course of winding back, causes the flange 25 to rotate together with the paper roll 23. Note that other bearing devices may be used. For example, a one-way clutch of a well-known type may be provided between the paper roll 23 and the core 38. The flange 25 may be firmly secured to the core 38.

Figure 4:
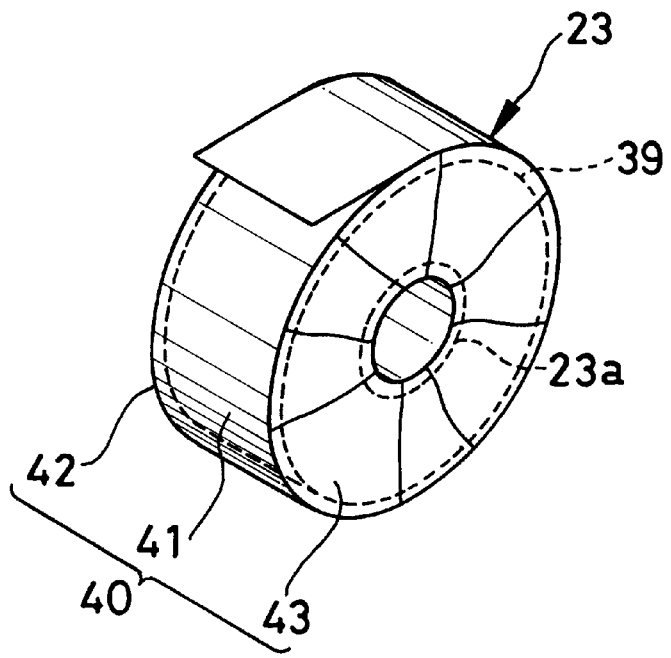
FIG. 4 is a perspective illustrating a photographic paper roll.
Figure 5:
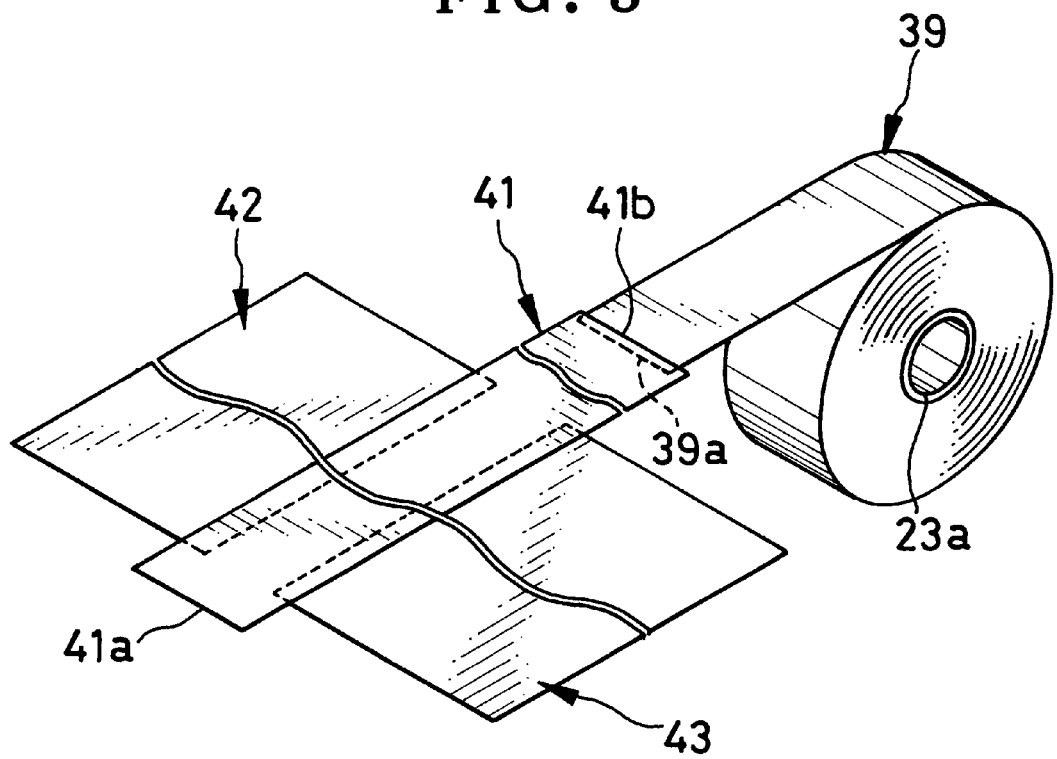
FIG. 5 is a perspective illustrating the same as FIG. 4 but in which light-shielding sheets are unfolded.

In FIGS. 4 and 5, the paper roll 23 includes the winding spool 23a and photographic paper 39 as photosensitive material wound about the winding spool 23a in a roll form. Plural light-shielding sheets 40 are disposed to cover the outside of the photographic paper 39. An example of the light-shielding sheets 40 is a polyethylene terephthalate sheet. The light-shielding sheets 40 are constituted by a leading sheet 41 and lateral sheets 42 and 43. The leading sheet 41 is a sheet strip with a considerable length. A rear edge 41b is connected with a front edge 39a of the photographic paper 39, to cover the outermost turn of the photographic paper 39. A front edge 41a of the leading sheet 41 is used as a tab for being pulled. The lateral sheets 42 and 43 are attached to sides of the leading sheet 41 in positions after the tab portion is kept to have a sufficient size. Remaining ends of the lateral sheets 42 and 43 opposite to that attached to the leading sheet 41 are attached to the inside of the winding spool 23a. So the lateral sheets 42 and 43 cover lateral faces of the paper roll 23 from the outermost turn toward the winding spool 23a.

Portions for splicing the leading sheet 41 to the lateral sheets 42 and 43 have a small strength and can be broken easily. The photographic paper 39 is drawn out by pulling the front edge 41a of the leading sheet 41. After the front edge 39a of the photographic paper 39 exits from the passageway 31, the leading sheet 41 is cut away. The lateral sheets 42 and 43 remain between the paper roll 23 and the flanges 24 and 25.

Figure 6:
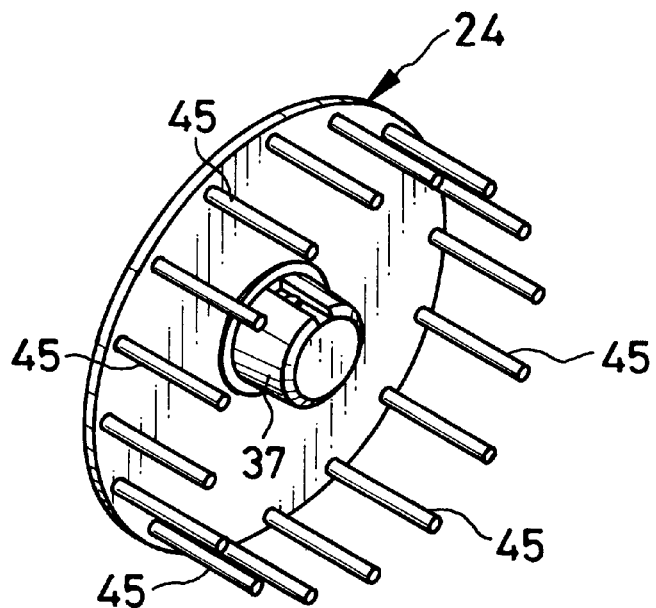
FIG. 6 is a perspective illustrating a remaining flange having receiving pins and a core.

In FIG. 6, receiving pins 45 as receiving portions project from the flange 24 to wind the photographic paper 39. A face of the flange 24 to neaten the paper roll 23 is provided with the receiving pins 45 at a regular pitch. The receiving pins 45 have a length smaller than a width of the photographic paper 39, but sufficient for receiving the photographic paper 39. The number of the receiving pins 45 is 16 as the angular pitch is 22.5 degrees according to the embodiment. Also, the receiving pins 45 are removably secured to the flange 24, and can be replaced to those according to a width of the photographic paper 39. The receiving pins 45 are kept rotatable on the flange 24 relative to fastener screws for the receiving pins 45, and are free from scratching or damaging the photographic paper 39 even in contact with the same. Note that the pitch or the number of the receiving pins 45 may be differently determined. Also, both of the flanges 24 and 25 may be provided with the receiving pins 45.

Figure 7:
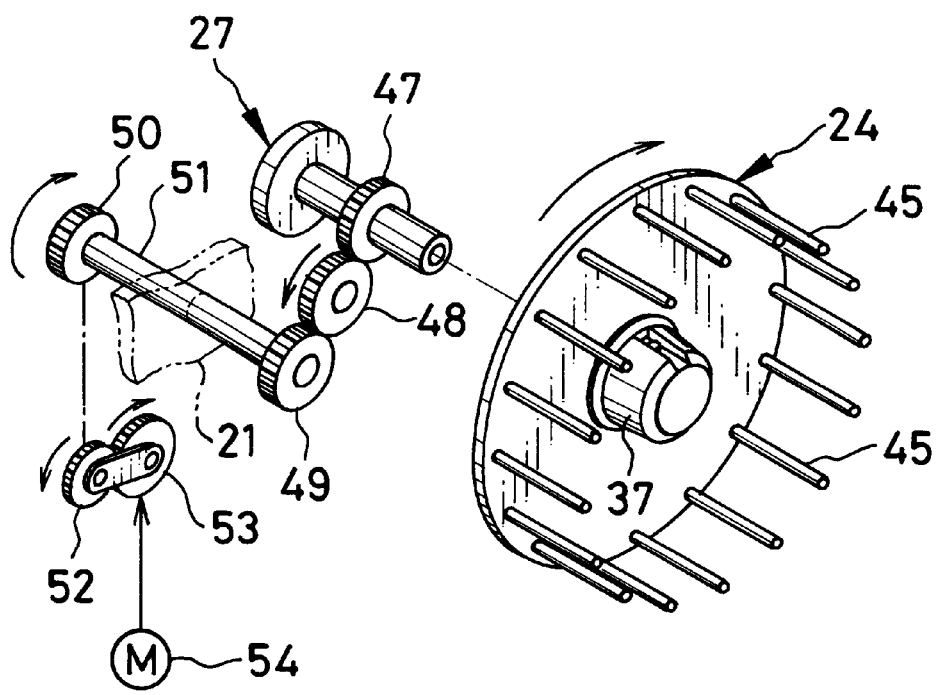
FIG. 7 is a perspective illustrating the flange, the core and a driving mechanism of a printer.

In FIG. 7, the shaft half 27 is inserted through the flange 24. A gear 47 is disposed with the shaft half 27. An intermediate gear 48 is disposed in the case base portion 21, and while the shaft half 27 is set in the case base portion 21, comes in mesh with the gear 47. A second intermediate gear 49 is disposed in the case base portion 21, and is in mesh with the intermediate gear 48. An input gear 50 is disposed outside the case base portion 21. A shaft 51 supports both the second intermediate gear 49 and the input gear 50 as one piece, and rotates together with those.

A planet gear 52 is disposed inside a printer/processor that is a machine including printer and processor sections. When the paper magazine 20 is set in the printer/processor, the input gear 50 comes in mesh with the planet gear 52. A sun gear 53 is meshed with the planet gear 52, which rotates about a center of the sun gear 53 between engaged and disengaged positions, and when in the engaged position, is meshed with the input gear 50, and when in the disengaged position, is moved away from the input gear 50. A motor 54 rotates the sun gear 53. The motor 54 rotates in a forward direction to unwind the photographic paper 39 from the paper magazine 20, and rotates in a backward direction to wind back the photographic paper 39 into the paper magazine 20. When the motor 54 rotates forwards, the sun gear 53 causes the planet gear 52 to rotate to the disengaged position. When the motor 54 rotates backwards, the sun gear 53 causes the planet gear 52 to rotate to the engaged position. In short, the planet gear 52 and the sun gear 53 are combined as a clutch mechanism. When the motor 54 rotates forwards, the clutch keeps the flanges 24 and 25 from rotating. When the motor 54 rotates backwards, the clutch causes the flanges 24 and 25 to rotate in the winding direction.

Figure 8:
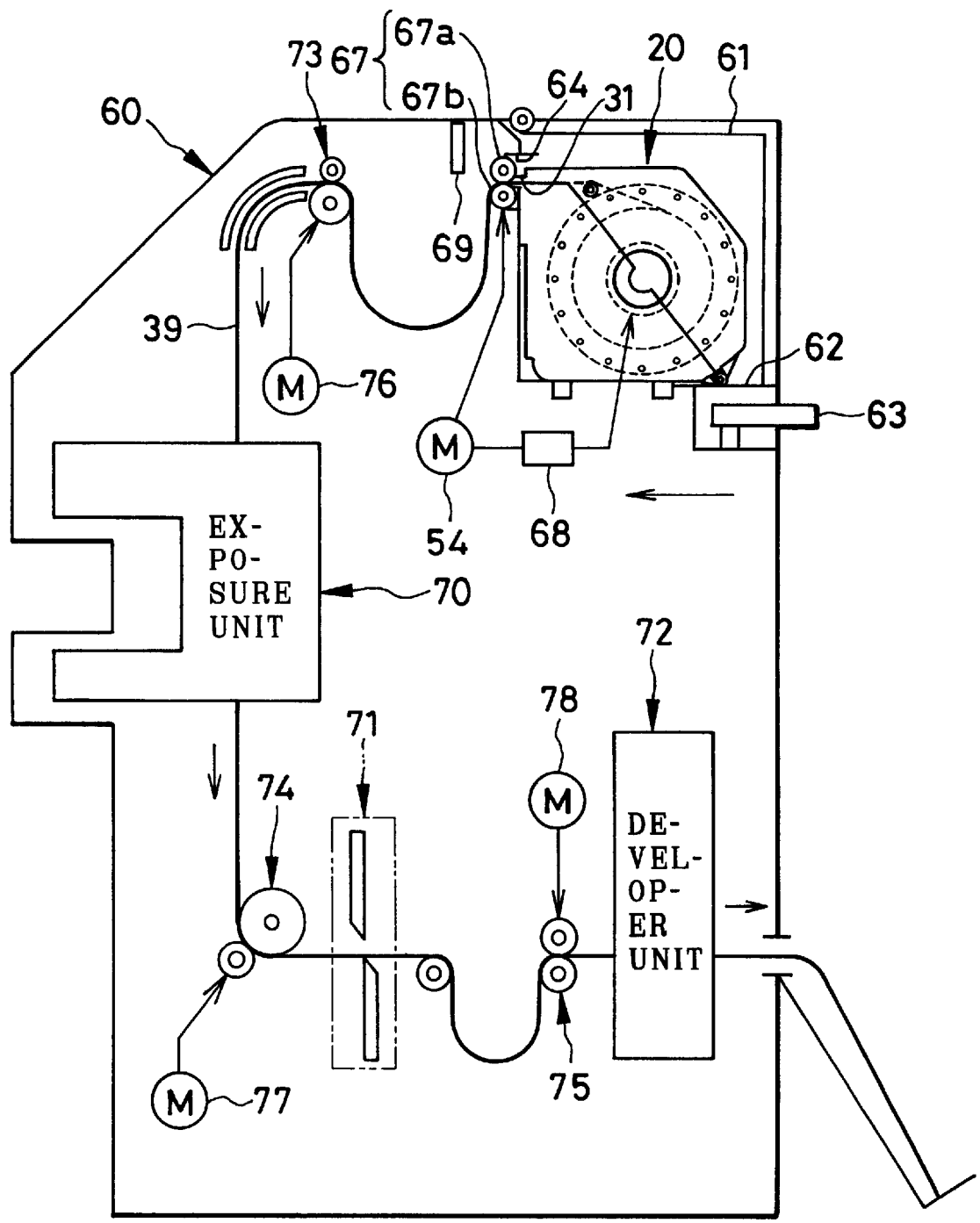
FIG. 8 is an explanatory view in section, illustrating the printer.

In FIG. 8, a printer/processor 60 includes a magazine holder chamber 62 for being loaded with the paper magazine 20. An openable lid 61 closes the magazine holder chamber 62. A handle 63 is disposed under the magazine holder chamber 62, externally operable for loading and unloading the paper magazine 20. The handle 63 is shiftable between a set position and a release position. The handle 63, when in the set position, causes the paper magazine 20 to move horizontally in the arrow direction inside the magazine holder chamber 62, and positions the paper magazine 20. The handle 63, when in the release position, causes the paper magazine 20 to move in reverse to the arrow direction, and releases the paper magazine 20 from being positioned.

An opening 64 is formed in the magazine holder chamber 62 for entry of the passageway 31 being positioned. In FIG. 1, cutouts 65 and 66 are formed in the passageway 31. A feeder roller set 67 is entered in the passageway 31 disposed inward from the opening 64 in the printer/processor. The feeder roller set 67 includes upper and lower rollers 67a and 67b. The upper roller 67a is moved between first and second positions by operation of the handle 63, and when in the first position, nips the photographic paper 39 between the same and the lower roller 67b, and when in the second position, releases the photographic paper 39 from being nipped. Also, the lower roller 67b is driven by the motor 54 to rotate.

To feed the photographic paper 39, the motor 54 is driven to rotate forwards. This rotation shifts the planet gear 52 to the disengaged position, and is not transmitted to the flanges 24 and 25. Note that a clutch mechanism 68 or planetary gear mechanism in the drawing is a component including the planet gear 52 and the sun gear 53.

In rotating the feeder roller set 67 to the photographic paper 39, the support shaft 26 does not rotate but is free. The photographic paper 39 passes through a gap between the receiving pins 45 at a portion between the paper roll 23 and the feeder roller set 67. One of the receiving pins 45 contacts the photographic paper 39 to stop rotation of the flange 24. However, the paper roll 23 rotates together with the support shaft 26 relative to the flange 24, so the photographic paper 39 can continue being drawn. To wind back the photographic paper 39, the motor 54 is caused to rotate backwards. The planet gear 52 is caused to rotate about the sun gear 53 to the engaged position. Thus, the support shaft 26 rotates. The friction or braking operation causes the flanges 24 and 25 to rotate together with the support shaft 26.

A front end sensor 69 is disposed downstream from the feeder roller set 67 in the feeding direction, for detecting the front end of the photographic paper 39. In winding back the photographic paper 39, a detection signal generated by the front end sensor 69 is monitored. In response to the detection signal from the front end sensor 69, the backward rotation of the motor 54 is stopped.

The photographic paper 39 moved to the printer/processor 60 is fed in sequence in an exposure unit 70, a cutter unit 71 and a developer unit 72, and then exited to the outside. The exposure unit 70 prints each of image frames in the developed photo film to the photographic paper 39. The developer unit 72 develops the photographic paper 39 after being exposed in the exposure unit 70. The cutter unit 71 cuts the photographic paper 39 along a borderline between exposed and unexposed portions, to separate the exposed portion by one frame. Note that feeder roller sets 73, 74 and 75 are disposed in positions upstream from respectively the exposure unit 70, the cutter unit 71 and the developer unit 72. Motors 76, 77 and 78 are connected to rotate the feeder roller sets 73–75. The feeder roller sets 73 and 74, to feed the photographic paper 39 to the exposure unit 70 and the cutter unit 71, are shiftable between a nip position and a retracted position. In winding back the photographic paper 39, the feeder roller sets 73 and 74 are shifted to the retracted position.

The operation of the above embodiment is described now. Before the paper roll 23 is set in the magazine case 20a, the flanges 24 and 25 are secured to respectively the cores 37 and 38. Then the shaft halves 27 and 28 are inserted through the cores 37 and 38 and into the hollowness in the winding spool 23a. Positions of the flanges 24 and 25 relative to the shaft halves 27 and 28 are adjusted by considering the width of the photographic paper 39. This adjustment is effected to set the center line of the photographic paper 39 at the center of the support shaft 26 in the axial direction. Thus, the cores 37 and 38 are tightly fitted in the inner space of the winding spool 23a, to support the paper roll 23. The paper roll 23 is now disposed between the flanges 24 and 25 and inside the receiving pins 45.

The paper roll 23 is contained in the case base portion 21 by inserting the ends of the support shaft 26 into the axial support recesses 32 and 33. Then the front edge 41a of the leading sheet 41 is pulled toward the passageway 31 through one of the gaps between the receiving pins 45 the nearest to the passageway 31. Therefore, the leading sheet 41 is drawn out, and at the same time is cut through spliced portions that have been connected to the lateral sheets 42 and 43.

When the front edge 41a of the leading sheet 41 comes to protrude from the passageway 31, the leading sheet 41 stops being pulled. The remaining portion of the leading sheet 41 is still covering the outside of the paper roll 23. After this, the case lid 22 is closed, and locked by the buckles 35 and 36. Ambient light is shielded from the inside of the magazine case 20a. Again, the front edge 41a of the leading sheet 41 from the passageway 31 is manually picked up and pulled. One of the receiving pins 45 comes in contact with the photographic paper 39. Rotation of the flange 24 is stopped. As the receiving pins 45 rotate by following the feeding of the photographic paper 39 relative to the fastening screws to the flange 24, occurrence of scratches is prevented.

In the course of the drawing operation, the photographic paper 39 becomes drawn to follow the leading sheet 41. When the photographic paper 39 exits slightly from the passageway 31, the drawing operation is stopped. The leading sheet 41 is cut away in the outside of the passageway 31, and eliminated from the photographic paper 39. Thus, the paper roll 23 finishes being loaded in the paper magazine 20.

To load the printer/processor 60 with the paper magazine 20, the openable lid 61 is opened. The paper magazine 20 is inserted, before the handle 63 is shifted to the set position. Thus, the paper magazine 20 is moved in the arrow direction indicated in FIG. 6, and positioned in a ready position. The portion including the passageway 31 is set into the opening 64. The feeder roller set 67 is inserted into the cutouts 65 and 66 in the passageway 31. The feeder roller set 67 is in the retracted position, but shifted to the nip position during operation of the handle 63 to the set position, to nip the front end of the photographic paper 39 that is accessible inside the cutouts 65 and 66.

Figure 9:
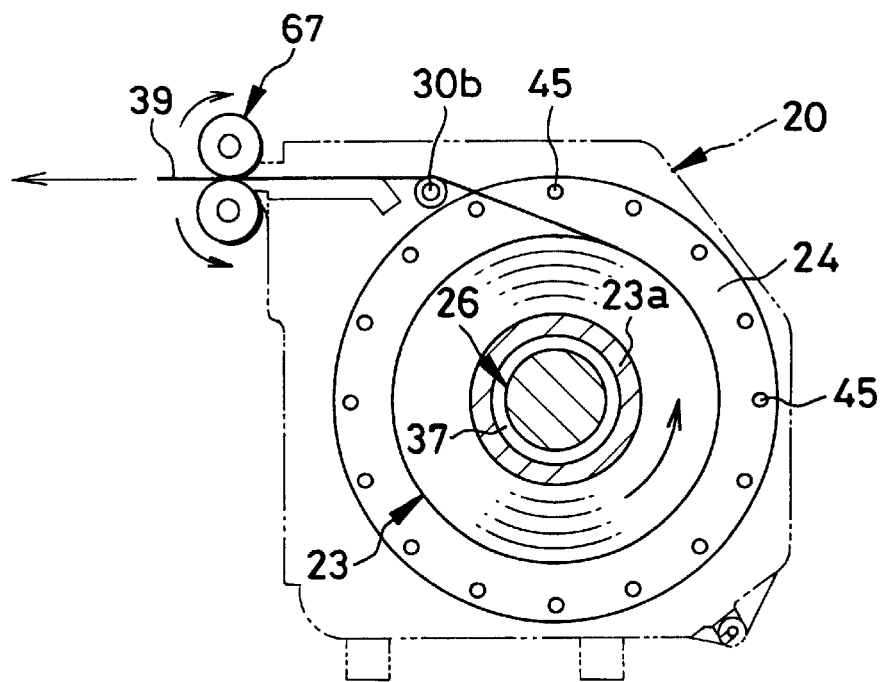
FIG. 9 is an explanatory view in section, illustrating a state of the photographic paper magazine in rotation in an unwinding direction.

In response to closing the openable lid 61, the operation of feeding the photographic paper 39 is started. The motor 54 and the motors 76–78 are driven to rotate forwards. Rotation of the motor 54 is transmitted to the feeder roller set 67. In response to this, the photographic paper 39 is drawn out in rotation of the paper roll 23 relative to the flange 24. See FIG. 9. When the photographic paper 39 moves past the feeder roller set 73, the feeder roller set 73 is shifted to the nip position, and then feeds the photographic paper 39 toward the exposure unit 70. When the photographic paper 39 reaches the exposure unit 70, the motor 54 and the motors 76–78 are stopped. Now the printer is in a ready state for the printing operation. Note that a paper reservoir is disposed between the feeder roller sets 67 and 73 in FIG. 8 for absorbing a difference in the feeding speeds between those.

The printer/processor 60 includes a photo film carrier, in which the developed photo film is set. When a key or button is operated, a command signal for printing is input. In the exposure unit 70, photometry is effected to measure an image frame in the photo film, to calculate a printing exposure amount according to a photometric value. Set positions of yellow, cyan and magenta filters are adjusted according to the exposure amount in a light path defined between the photo film carrier and a light source. After the adjustment, a shutter is actuated. Light is emanated by the light source, passed through the filters and a diffuser box, and focused on the photographic paper 39 by a printing lens. After the exposure, the motors 54 and 76 are driven to rotate forwards, to feed the photographic paper 39 by one frame. Thus, the image frames in the negative photo film are printed to the photographic paper 39 frame after frame. After the printing, the photographic paper 39 is fed toward the developer unit 72. In response to passage of the front end of the photographic paper 39, the feeder roller sets 74 and 75 are shifted to the nip position.

When all frames are exposed in relation to one strip of the photo film, the motor 54 and the motors 76–78 are rotated forwards to feed the photographic paper 39. A final borderline between a final exposed portion and an unexposed portion is sent to the cutter unit 71. Upon the reach of the borderline, the motor 54 and the motors 76–78 are stopped. The cutter unit 71 is actuated to cut the photographic paper 39 along the borderline. Then the motor 78 is driven to rotate forwards, to feed the photographic paper 39 to the developer unit 72. The photographic paper 39 is developed by the developer unit 72, and then exited to the outside of the printer/processor 60.

Figure 10:
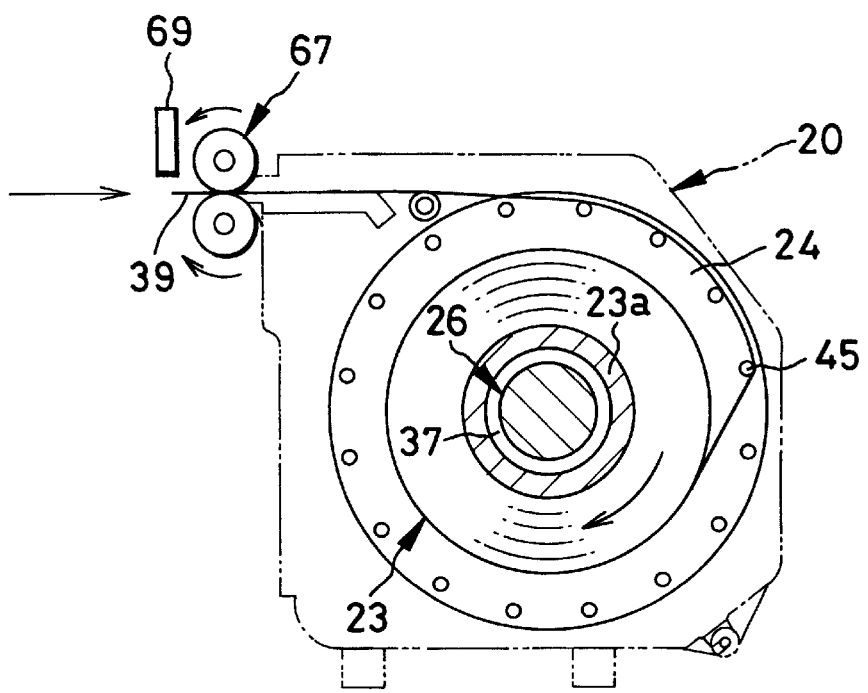
FIG. 10 is an explanatory view in section, illustrating a state of the photographic paper magazine in rotation in a winding direction.

An unexposed portion of the photographic paper 39 is wound back into the paper magazine 20. To this end, the feeder roller sets 73 and 74 are moved to the retracted position, before the motor 54 is driven to rotate backwards. This rotation causes the feeder roller set 67 to rotate in the winding direction. As the planet gear 52 rotates to the engaged position, the rotation is transmitted to the support shaft 26. Due to the frictional contact with the support shaft 26, the flanges 24 and 25 rotate in the winding direction. When the flanges 24 and 25 rotate in the winding direction, the photographic paper 39 becomes extended to lie along an orbit defined by the receiving pins 45. See FIGS. 10 and 11. Therefore, the photographic paper 39 can be prevented from frictionally contacting the lateral sheets 42 and 43. A range where lateral edges of the photographic paper 39 frictionally contact the flanges 24 and 25 can be small irrespective of a diameter of the roll. Damages to the lateral edges of the photographic paper 39 being wound back can be reduced considerably. The receiving pins 45 operate as a roller themselves, to minimize damages to the photographic paper 39.

The backward rotation of the motor 54 is stopped when the front end sensor 69 detects a front end of the photographic paper 39. After this, the front end of the photographic paper 39 is kept nipped by the feeder roller set 67. The remainder of the photographic paper 39 is still contained in the paper magazine 20 and shielded from ambient light. Now the printer is ready for printing the next time.

Note that the receiving pins 45 may have an extendable or shortenable structure in a manner of a rod antenna, and can be adjustable in consideration of a width of the photographic paper 39. In the present embodiment, the receiving pins 45 have a circular shape as viewed in cross section. However, a shape of the receiving pins 45 as viewed in cross section may be any suitable form, and may be quadrilateral, elliptical, or a quadrilateral shape of which two side lines are curved convexly. Furthermore, each of both the flanges 24 and 25 can be provided with the receiving pins 45 protruding toward each opposite flange. The receiving pins 45 of the flange 25 may be opposed to the receiving pins 45 of the flange 24. Alternatively, the receiving pins 45 of the flange 25 may be disposed alternately with the receiving pins 45 of the flange 24.

Figure 12:
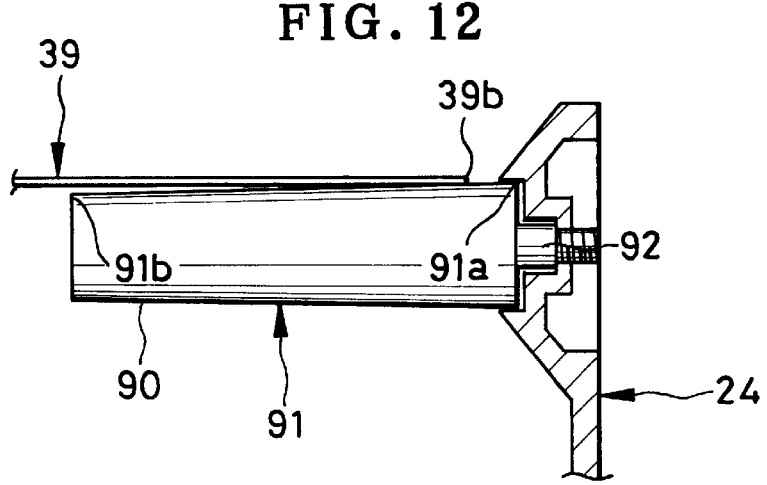
FIG. 12 is a front elevation illustrating another preferred receiving pin constructed as a roller.

In FIG. 12, another preferred embodiment is illustrated, which has receiving pins or rollers 91 as receiving portions. A roller shaft 92 is fixed to the flange 24, and supports the receiving pins 91 in a rotatable manner. A conical surface 90 with an inclination is provided in the periphery of the receiving pins 91. The conical surface 90 has such a shape as to have a greater diameter on the side of the flange 24, and have a smaller diameter in a middle position between the flanges 24 and 25. This is effective in preventing a paper edge 39b of the photographic paper 39 from contacting and scratching the flanges 24 and 25. Furthermore, the receiving pins 91 have roller edges 91a and 91b. The roller edge 91a is located nearer to the flange 24, and is shaped to come into a space surrounded by portions of the flange 24. This is advantageous that the roller edge 91a does not contact the photographic paper 39, and can be prevented from damaging the photographic paper 39.

Figure 13:
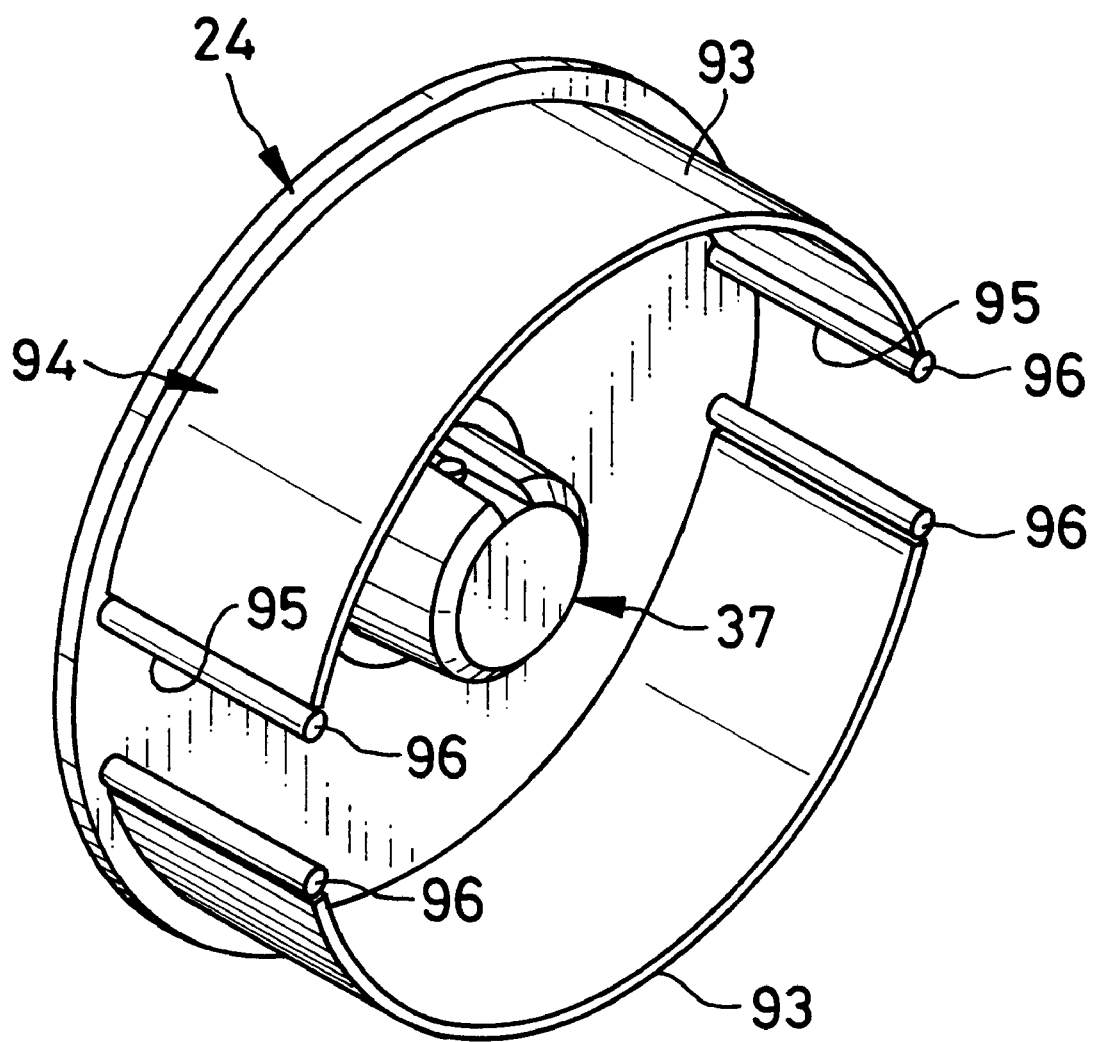
FIG. 13 is a perspective illustrating another preferred flange having arc-shaped receiving portions.

Receiving portions according to the invention do not have to be pins. In FIG. 13, a preferred embodiment having receiving ridges 94 as receiving portions is illustrated. An arc-shaped surface 93 is formed as an outer surface of the receiving ridges 94, and is oriented to follow a circular edge of the flange 24. An inner surface of the receiving ridges 94 may also be arc-shaped so as to locate the paper roll 23 in a position inside the receiving ridges 94. The receiving ridges 94 are fixedly secured to the flange 24 to protrude toward the periphery of the paper roll 23. Passage spaces 95 are defined between the receiving ridges 94 arranged intermittently. The front edge 41a of the leading sheet 41 or the front edge 39a of the photographic paper 39 is drawn out through any one of the passage spaces 95. The number of the passage spaces 95 is two according to the present embodiment, but may be one, or three or more. Guide pins 96 are disposed along lateral sides of the passage spaces 95, and can contact the photographic paper 39 without scratching the photographic paper 39. Also, the guide pins 96 can be elongated, and have an end engaged with the flange 25. This is effective in synchronizing rotation of the flanges 24 and 25.

Figure 14:
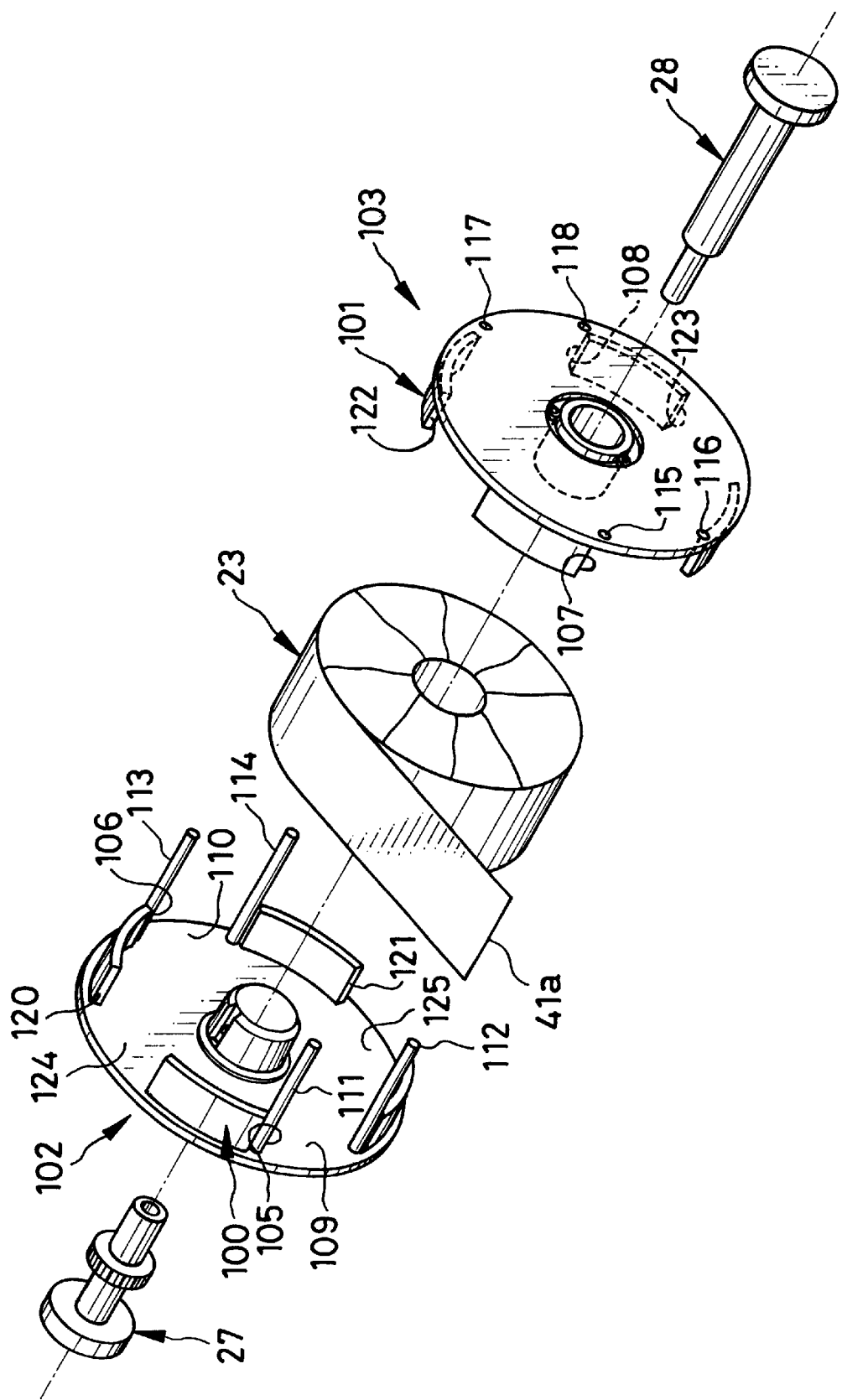
FIG. 14 is an exploded perspective illustrating another preferred embodiment in which each of two flanges have receiving portions.
Figure 15:
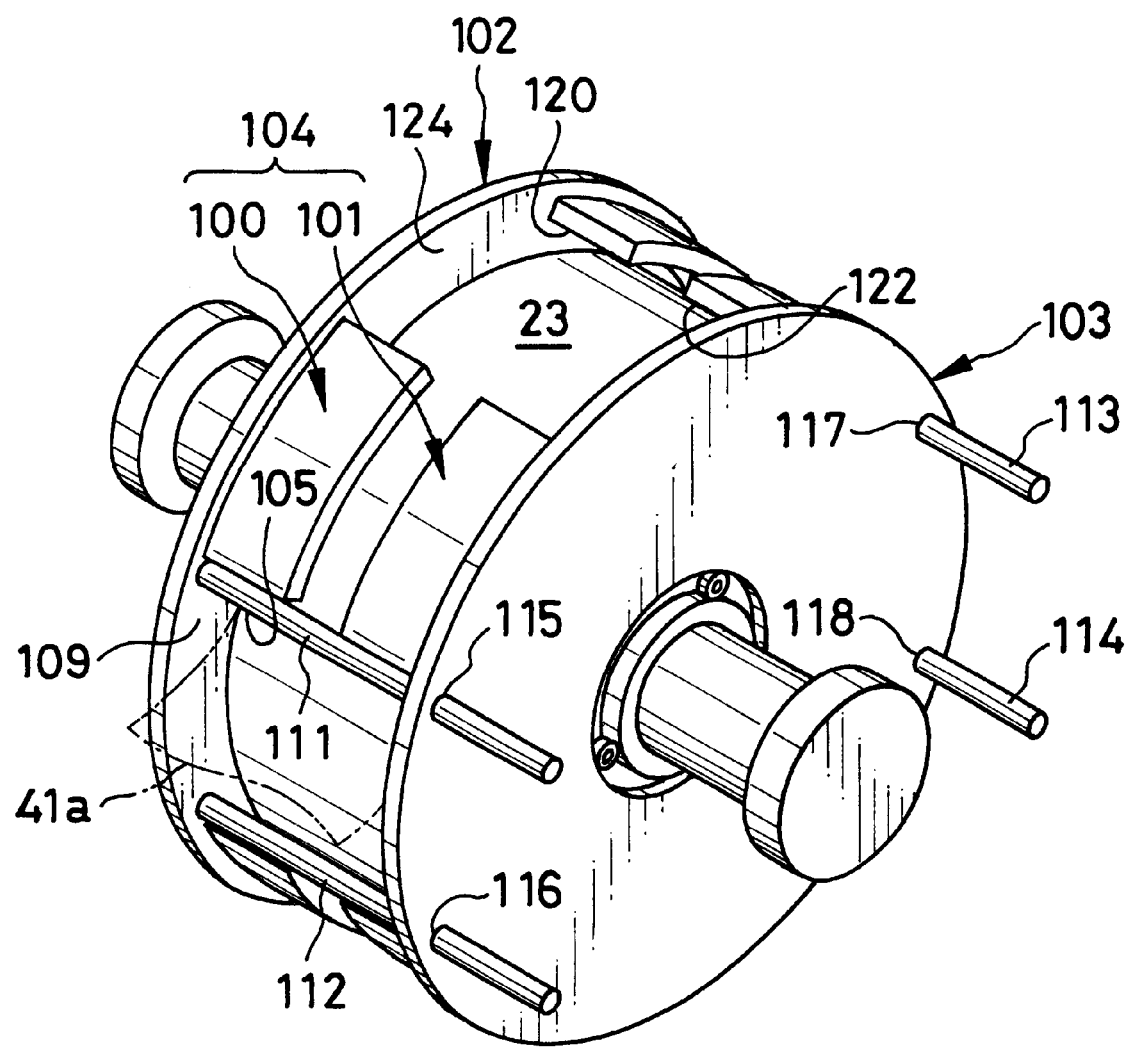
FIG. 15 is a perspective illustrating the same as FIG. 14.

In FIGS. 14 and 15, another preferred embodiment is illustrated, in which four receiving ridges 100 in a first group protrude from a flange 102. Four receiving ridges 101 in a second group protrude from a flange 103. Each of the receiving ridges 100 and 101 have an arc-shaped outer surface of which a circle including the arc is defined about the rotational axis of the flanges 102 and 103. The receiving ridges 100 protrude toward the flange 103, the receiving ridges 101 protruding toward the flange 102. Receiving ridge pairs 104 as receiving portions are constituted by the receiving ridges 100 and 101. The flanges 102 and 103 are so settable that an interval between those can be adjusted in consideration of a paper width of the paper roll 23. Thus, the receiving ridges 100 and 101 have such a size that the interval between those is minimized when a type of the paper roll 23 having a smallest paper width is set. Therefore, the receiving ridges 100 and 101 can support lateral edges of the paper roll 23 even of a type having a relatively great paper width.

Passage gaps 105 and 106 are defined between the receiving ridges 100. Passage gaps 107 and 108 are defined between the receiving ridges 101. A passage space 109 is constituted by the passage gaps 105 and 107. A passage space 110 is constituted by the passage gaps 106 and 108, and is positioned opposite to the passage space 109. The front edge 41a of the leading sheet 41 or the front edge 39a of the photographic paper 39 is pulled out through one of the passage spaces 109 and 110.

Guide pins 111, 112, 113 and 114 protrude from the flange 102, are arranged on sides of the passage spaces 109 and 110, and protects the photographic paper 39 from being scratched. The guide pins 111–114 have a considerably great length. Holes 115, 116, 117 and 118 are formed in the flange 103, and receives insertion of the guide pins 111–114. Thus, the guide pins 111–114 have such a length as to reach the holes 115–118 in the flange 24 even when a type of the paper roll 23 having a greatest paper width is set. The guide pins 111–114 make it possible to keep the flange 102 rotationally positioned equally to the flange 103. There occurs no problem of irregular positioning of the passage gaps 105–108, and no problem of interference with the photographic paper 39 being fed.

Auxiliary gaps 120, 121, 122 and 123 are defined between the receiving ridges 100 and between the receiving ridges 101, and positioned alternately with the passage spaces 109 and 110. An auxiliary space 124 is constituted by the auxiliary gaps 120 and 122. An auxiliary space 125 is constituted by the auxiliary gaps 121 and 123. The position of the auxiliary spaces 124 and 125 is different from that of the passage spaces 109 and 110 by an angle of 90 degrees.

Figure 16:
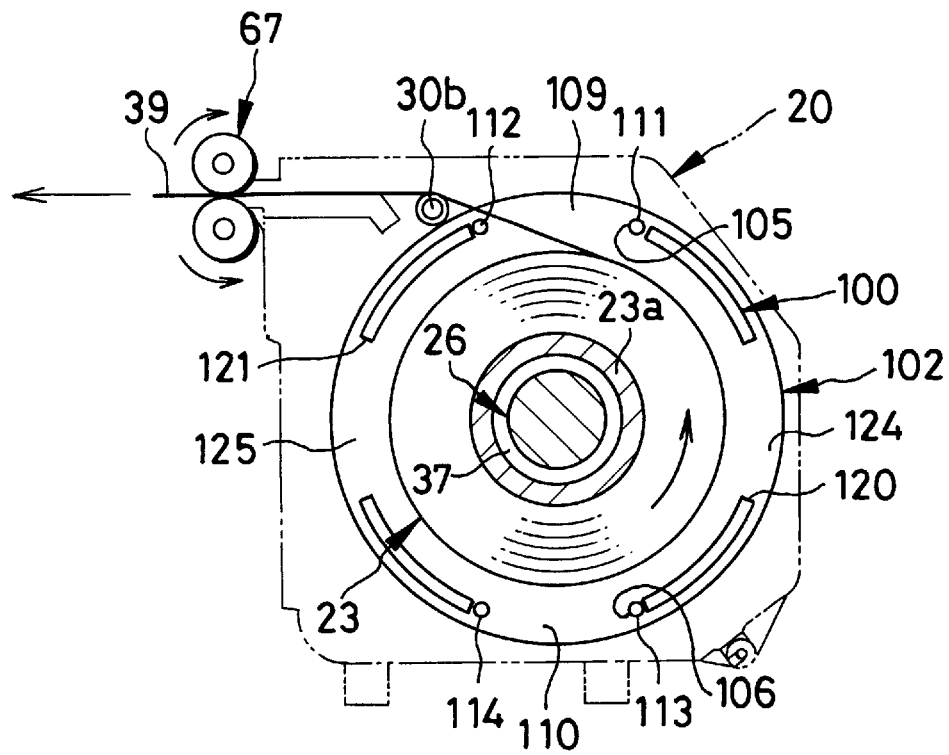
FIG. 16 is an explanatory view in section, illustrating a state of the photographic paper magazine in rotation in an unwinding direction.

The operation of the embodiment of FIGS. 14 and 15 is described. The feeding operation draws out the photographic paper 39 from the paper roll 23 in rotation of the flanges 102 and 103 with the paper roll 23. See FIG. 16. When the guide pin 111 comes in contact with the photographic paper 39 directed to the passageway 31, the flanges 102 and 103 stop rotating. After this, only the paper roll 23 rotates while the photographic paper 39 is drawn.

Figure 17:
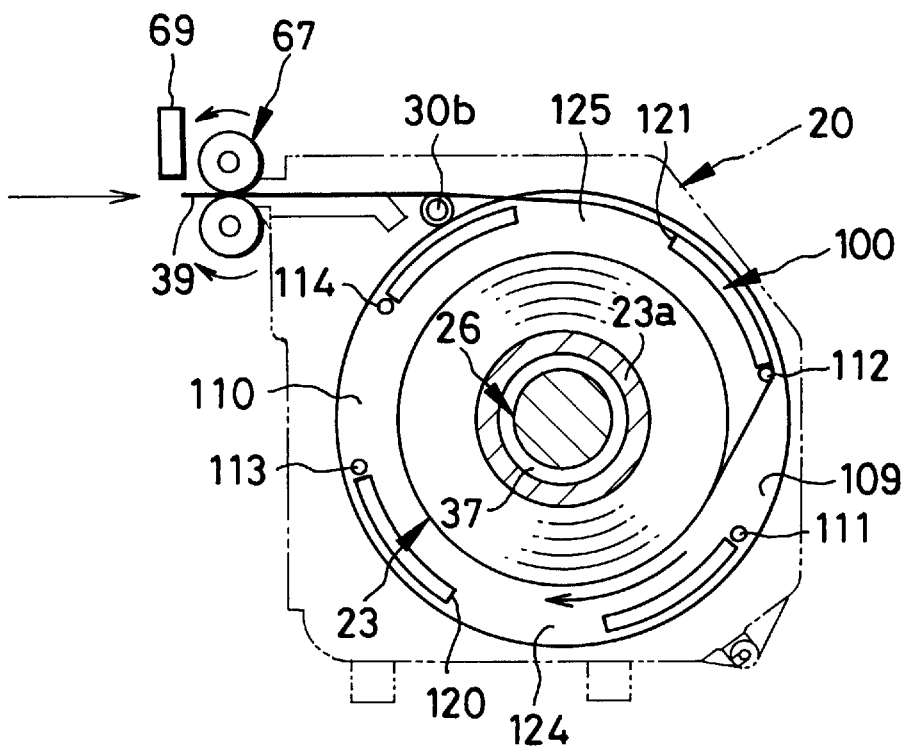
FIG. 17 is an explanatory view in section, illustrating a state of the photographic paper magazine in rotation in a winding direction.
Figure 18:
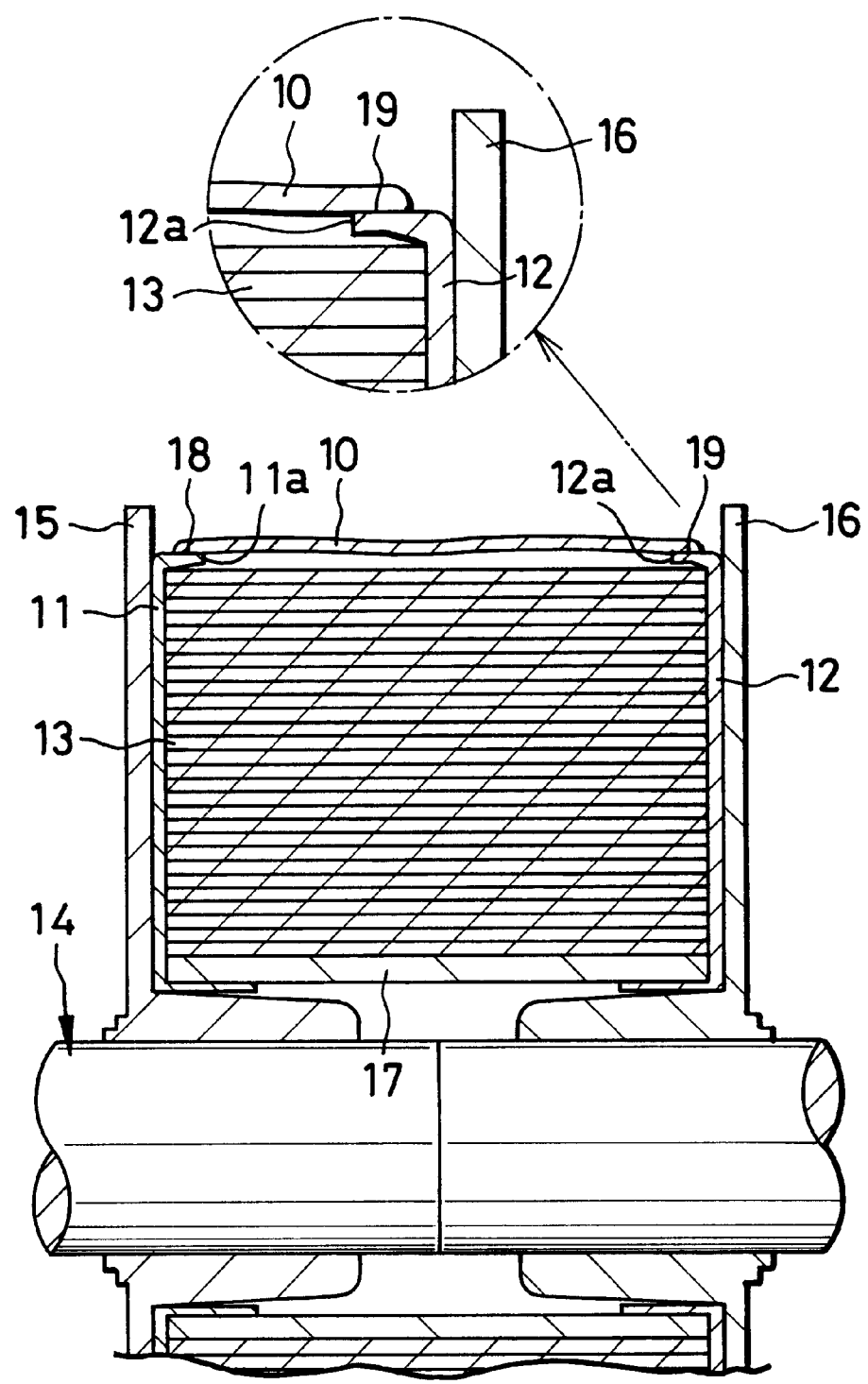
FIG. 18 is a cross section, partially cut away, illustrating elements of a photographic paper magazine of the prior art.

When the printing and development are all completed, an unexposed portion of the photographic paper 39 is wound back into the paper magazine 20. The support shaft 26 comes to rotate backwards, to rotate the flanges 102 and 103 in the winding direction of the photographic paper 39. In response, the photographic paper 39 becomes wound on the arc-shaped surface of the receiving ridges 100 and 101 and the hole 112. See FIG. 17. It is possible to prevent the lateral sheets 42 and 43 from frictionally contacting and scratching the photographic paper 39.

In the above embodiment, the braking effect between the braking contact surfaces of the core 37 and the flange 24 should be created by use of additional elements. For example, the braking contact surface of the flange 24 and the braking contact surface of the ring portion of the core 37 may be formed with a surface roughness. Also, a spring or bias mechanism may be added to bias the support shaft 26 and the cores 37 and 38 toward the shaft end 27a. Furthermore, a spring or bias mechanism may be added to bias the flange 24 toward the flange 25.

In the above embodiment, the braking is effected on both sides of the flanges 24 and 25. However, it is possible not to effect the braking operation between the core 38 and the flange 25. Only the braking should be effected between the core 37 and the flange 24.

Any of the above embodiments has the plurality of the receiving pins 45 or 91, the receiving ridges 94 or the receiving ridge pairs 104. However, the number of receiving portions may be at least one. A single arc-shaped receiving portion may be in a C shape and define a single passage space.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photosensitive material magazine for containing a photosensitive material roll of photosensitive material, comprising:

a magazine case;

a support shaft, contained in said magazine case in a rotatable manner, and secured to an axis of said photosentitive material roll in a rotationally immovable manner;

first and second flanges, disposed on said support shaft, for neatening end faces of said photosensitive material roll;

a passageway, formed in said magazine case, for passage of said photosensitive material in and out; and a receiving portion, formed to project from an edge portion of said first flange toward said second flange, for defining a passage space between edges of said receiving portion, said passage space allowing passage of said photosensitive material extending from said photosensitive material roll toward said passageway at least when said first flange is stopped, and said support shaft is rotated with said photosensitive material roll, wherein when said support shaft and said first flange are rotated in a winding direction, said receiving portion temporarily winds a portion of said photosensitive material extending out of said passage space so that the portion of said photosensitive material is extended to lie on said receiving portion and spaced apart from said photosensitive material roll.

2. A photosensitive material magazine as defined in claim 1, wherein said support shaft is rotatable in an unwinding direction and said winding direction;

further comprising a bearing device for securing said first and second flanges to said support shaft, changeable in first and second states, for setting said first flange rotatable relative to said support shaft, and for setting said first flange rotationally immovable relative to said support shaft;

wherein while said photosensitive material is drawn from said photosensitive material roll, said bearing device is in said first state, for allowing said support shaft to rotate in said unwinding direction relative to said first flange stopped by said photosensitive material and said receiving portion;

when said support shaft is rotated in said winding direction, said bearing device is in said second state, for rotating said first flange together with said support shaft, thereby temporarily to wind said photosensitive material on said receiving portion.

3. A photosensitive material magazine as defined in claim 2, wherein said photosensitive material roll includes a tubular winding spool on which said photosensitive material is wound in a roll form;

said bearing device includes:

first and second cores, fitted in respectively first and second ends of said winding spool, having first and second axial holes in which said support shaft is fitted, for transmitting rotation of said support shaft to said photosensitive material roll; and first and second axial openings, formed in said first and second flanges, for receiving insertion of said first and second cores.

4. A photosensitive material magazine as defined in claim 3, wherein said bearing device further includes:

first and second bearing mechanisms for keeping said first and second flanges rotatable about said first and second cores, thereby to set said first state;

a braking mechanism, actuated when rotational torque applied between said first flange and said first core is smaller than a limit torque, for keeping said first flange stationary on said first core by braking, thereby to set said second state.

5. A photosensitive material magazine as defined in claim 4, wherein said first core includes an outer end portion and an inner end portion, said outer end portion is inserted in said first axial hole, and said inner end portion is secured to said first end of said winding spool;

each of said first and second bearing mechanisms includes plural bearing rollers, secured to an outer face of said first flange in a rotatable manner, disposed close to said first axial hole, for contacting one portion of said outer end portion of said first core, to keep said first core rotatable about said first flange.

6. A photosensitive material magazine as defined in claim 5, wherein said braking mechanism includes:

a first contact surface formed in said first flange;

a second contact surface, formed in said first core, for frictionally contacting said first contact surface.

7. A photosensitive material magazine as defined in claim 4, wherein said receiving portion includes plural receiving pins arranged in a substantially equidistant manner from said axis.

8. A photosensitive material magazine as defined in claim 7, further comprising plural auxiliary bearing mechanisms for supporting respectively said plural receiving pins on said first flange in a rotatable manner.

9. A photosensitive material magazine as defined in claim 7, further comprising holes, formed in said second flange, for passing through of said receiving pins;

wherein said receiving pins are inserted in said holes with said photosensitive material roll positioned between said first and second flanges.

10. A photosensitive material magazine as defined in claim 4, wherein said receiving portion includes plural arc-shaped receiving ridges arranged in a substantially equidistant manner from said axis.

11. A photosensitive material magazine as defined in claim 10, wherein said receiving portion further includes plural guide pins arranged close to said plural arc-shaped receiving ridges, having a curved surface, for preventing said photosensitive material from being damaged in passage between said plural receiving ridges.

12. A photosensitive material magazine as defined in claim 4, wherein said receiving portion comprises a first group of plural receiving portions;

further comprising a second group of plural receiving portions, formed to project from an edge portion of said second flange toward said first group, and adapted for temporarily winding a portion of said photosensitive material drawn from said photosensitive material roll.

13. A photosensitive material magazine as defined in claim 12, further comprising:

plural guide pins, formed to project from said edge portion of said first flange, and arranged about a peripheral surface of said photosensitive material roll; and plural holes, formed through said edge portion of said second flange, for receiving said plural guide pins in a slidable manner.

14. A photosensitive material magazine as defined in claim 4, wherein said photosensitive material magazine is used with a printer, said printer includes:

a motor for rotating in first and second directions;

a feeder roller, driven by said motor, for feeding said photosensitive material from said photosensitive material roll while said motor rotates in said first direction;

a clutch mechanism, secured between said motor and said support shaft, for disconnecting said support shaft from said motor while said motor rotates in said first direction, and for causing said support shaft to rotate together with said feeder roller while said motor rotates in said second direction.

* * * * *